United States Patent
Gomez et al.

(10) Patent No.: US 9,926,862 B2
(45) Date of Patent: Mar. 27, 2018

(54) METHOD OF OPERATING AN INTERNAL COMBUSTION ENGINE CONNECTED TO AN ELECTRIC GENERATOR

(71) Applicant: GE Jenbacher GmbH & Co OG, Jenbach (AT)

(72) Inventors: Jose Gomez, Reutlingen (DE); Herbert Kopecek, Schwaz (AT); Erich Kruckenhauser, Muenster (AT); Herbert Schaumberger, Muenster (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 0 days.

(21) Appl. No.: 14/527,210

(22) Filed: Oct. 29, 2014

(65) Prior Publication Data
US 2015/0115616 A1 Apr. 30, 2015

(30) Foreign Application Priority Data

Oct. 30, 2013 (AT) .................. A 832/2013

(51) Int. Cl.
*H02P 9/00* (2006.01)
*F02D 29/06* (2006.01)
(Continued)

(52) U.S. Cl.
CPC ........... *F02D 29/06* (2013.01); *F02D 31/007* (2013.01); *F02D 41/021* (2013.01); *F02D 41/36* (2013.01);
(Continued)

(58) Field of Classification Search
CPC .......... H02P 9/102; H02P 9/04; F02D 41/021; F02D 31/007; F02D 29/06; F02D 2200/1012; F02D 2041/2093; F03D 5/02
(Continued)

(56) References Cited

U.S. PATENT DOCUMENTS 3,529,174 A * 9/1970 Smith .................. H02J 3/24
307/43
3,609,426 A * 9/1971 Gaul ................... H02J 9/066
290/4 C
(Continued)

FOREIGN PATENT DOCUMENTS

DE  10 2006 003 425   8/2006
DE  10 2007 045 195   3/2009
(Continued)

OTHER PUBLICATIONS

European Search Report issued Nov. 13, 2015 in corresponding European Application No. 14190675 (with English translation).
(Continued)

*Primary Examiner* — Julio C. Gonzalez
(74) *Attorney, Agent, or Firm* — GE Global Patent Operation; Rita D. Vacca

(57) ABSTRACT

A method involves operating an internal combustion engine connected to an electric generator, in particular a synchronous generator, during a network fault, in particular during an electric short-circuit, in a power supply network connected to the generator. A mechanical power delivered by the internal combustion engine is introduced into the generator and converted into electric power in the generator. The electric power is delivered to the power supply network, and the mechanical power delivered by the internal combustion engine is at least temporarily increased depending on the value of at least one operating parameter of the generator and/or the internal combustion engine prior to the network fault and/or during the network fault, preferably by an amount of a fuel introduced into the internal combustion engine being increased.

19 Claims, 3 Drawing Sheets

(51) Int. Cl.
*F02D 41/02* (2006.01)
*F02D 31/00* (2006.01)
*F02D 41/36* (2006.01)
*H02P 9/04* (2006.01)
*F02D 41/20* (2006.01)
*H02P 9/10* (2006.01)

(52) U.S. Cl.
CPC ........ *H02P 9/04* (2013.01); *F02D 2041/2093* (2013.01); *F02D 2200/1012* (2013.01); *H02P 9/102* (2013.01)

(58) Field of Classification Search
USPC ........ 290/52, 40 C, 40 B, 40 R; 60/651, 671
See application file for complete search history.

(56) References Cited

U.S. PATENT DOCUMENTS

| | | | | |
|---|---|---|---|---|
| 6,555,929 | B1* | 4/2003 | Eaton | F02D 11/105 290/24 |
| 7,701,087 | B2* | 4/2010 | Eckroad | H02J 3/16 307/46 |
| 2006/0192533 | A1 | 8/2006 | Kimura et al. | |
| 2007/0028892 | A1 | 2/2007 | Schmid | |
| 2009/0261599 | A1* | 10/2009 | Alston | B60L 15/2045 290/40 B |
| 2010/0256890 | A1 | 10/2010 | Baldauf et al. | |
| 2011/0180043 | A1* | 7/2011 | Falkowski | F02D 37/02 123/478 |
| 2012/0105318 | A1 | 5/2012 | Nutaro et al. | |
| 2012/0175876 | A1 | 7/2012 | Pendray et al. | |
| 2012/0292921 | A1 | 11/2012 | Fahringer et al. | |
| 2014/0074311 | A1* | 3/2014 | Kearns | H02J 3/38 700/297 |
| 2014/0366840 | A1* | 12/2014 | Sivasubramanian | F02D 41/0025 123/399 |
| 2015/0105923 | A1* | 4/2015 | Beekmann | H02J 3/24 700/287 |

FOREIGN PATENT DOCUMENTS

| | | |
|---|---|---|
| DE | 10 2011 105 430 | 8/2012 |
| EP | 1 775 450 | 4/2007 |
| EP | 2 317 640 | 5/2011 |
| EP | 2868903 B1 | 12/2016 |
| JP | 5-33689 | 4/1993 |
| JP | 5-268798 | 10/1993 |
| JP | 2004257285 A | 9/2004 |
| JP | 2005-171890 | 6/2005 |
| KR | 10-2011-0111299 | 10/2011 |
| WO | 2010/134994 | 11/2010 |
| WO | 2011/088483 | 7/2011 |
| WO | WO 2013/128023 A2 * | 9/2013 |

OTHER PUBLICATIONS

Austrian Patent Office Search Report (ASR) issued Oct. 16, 2014 in corresponding Austrian Patent Application No. A 832/2013.
Teruhisa Kumano et al. "Effect of back-swing phenomenon on the transient stability of synchronous machines" Electrical Engineering, vol. 109, No. 5, pp.403-410, Sep., 1989.
Japanese office action issued in connection with corresponding JP application No. 2014220089 dated Jan. 26, 2016.
Japanese notice of allowance issued in connection with corresponding JP application No. 2014220089 dated Nov. 30, 2016.
Korean office action issued in connection with corresponding KR application No. 1020140149530 dated Jan. 24, 2017.

* cited by examiner

METHOD OF OPERATING AN INTERNAL COMBUSTION ENGINE CONNECTED TO AN ELECTRIC GENERATOR

BACKGROUND OF THE INVENTION

The invention concerns a method of operating an internal combustion engine connected to an electric generator, in particular a synchronous generator, during a network fault, in particular during an electric short-circuit, in a power supply network connected to the generator. A mechanical power delivered by the internal combustion engine is introduced into the generator and is converted into electric power in the generator, and the electric power is delivered to the power supply network.

During a network fault in a power supply network, in particular during an electric short-circuit and the concomitant drop in network voltage in the power supply network, unwanted changes in operating parameters of an electric generator connected to the power supply network, in particular a synchronous generator, such as the rotary speed or the load angle of the generator, can occur at the generator. The term load angle is used to denote the angle between the vector of the rotating magnetic field in the stator of the generator and the vector of the rotating magnetic field in the rotor of the generator.

The drop in the network voltage leads to a significant reduction in the delivery of electric power from the generator to the power supply network. In the case of usual configurations in which a rotor of the generator is connected to an engine shaft, driving the rotor, of an internal combustion engine (for example a gas engine) that drop in electric power can lead to a corresponding increase in the rotary speed of the internal combustion engine and therewith the rotor. As a result, synchronization of the generator with the power supply network can be lost or damage in the generator can even be caused.

Detection of a network fault in the power supply network can be effected, for example, by the network voltage of the power supply network and/or the electric current fed into the power supply network by the generator and/or the rotary speed of the generator or the internal combustion engine and/or the torque at the engine shaft of the internal combustion engine or at the rotor shaft of the generator being monitored. In that case, upon the occurrence of a change in at least one of those monitored operating parameters beyond a predeterminable threshold value, a network fault is detected. In that respect, changes which occur are detected as a network fault only when a plurality of those operating parameters involve corresponding changes beyond predeterminable threshold values, if for example both the network voltage, the electric current and also the rotary speed involve corresponding deviations. The generator can remain connected to the power supply network during a network fault.

The conventional approach for reacting to such network faults is to take suitable measures in order to counteract such an increase in the rotary speed and an increase related thereto in the load angle of the generator. Thus, measures are usually taken which reduce the rotary speed and the load angle. Such a measure, by way of example, is a reduction in the acceleration moment by an internal combustion engine connected to the generator being correspondingly throttled.

It has been found, however, that the conventional measures are disadvantageous in the event of a network fault in certain situations. Thus, the rotary speed of the generator might not increase upon the occurrence of a network fault, but firstly falls. That effect, which is known to a person skilled in the art by the English technical term "back-swing", can under some circumstances even lead to pole slip of the generator. Pole slip in turn leads to an instability of the generator, in which a mechanical power introduced into the rotor by an internal combustion engine by way of the engine shaft can no longer be converted as desired into electric power by the generator.

SUMMARY OF THE INVENTION

The object of the invention is to avoid the above-described disadvantages and to provide a method of operating an internal combustion engine connected to an electric generator, in particular a synchronous generator, during a network fault in the power supply network, that is improved over the state of the art.

The present invention is related to subtransient effects, that is, to events taking place in a time scale of a few 10 milliseconds (ms) after a network fault. Preferably, the invention is applied at power supply networks in which the power supplied to the network by the internal combustion engine is considerably lower (e.g. less than 10%, preferably less than 1%) than the total power of the power supply network.

According to the invention, the mechanical power delivered by the internal combustion engine is at least temporarily increased depending on the value of at least one operating parameter of the generator and/or the internal combustion engine prior to the network fault and/or during the network fault, preferably by an amount of a fuel introduced into the internal combustion engine being increased.

In that way, it is possible to counteract a drop in rotary speed which occurs—in particular during a back-swing—and which in the most disadvantageous case can even lead to pole slip of the generator.

In accordance with a preferred embodiment, the fuel is introduced into the internal combustion engine, preferably into an induction tract of the internal combustion engine, by at least one fuel metering device. Preferably, there is a respective fuel metering device for each cylinder of the internal combustion engine. In that respect, the amount of the fuel introduced into the internal combustion engine is increased by an open position and/or open time of the at least one fuel metering device being altered, wherein the at least one fuel metering device can be in the form of a port injection valve.

Particularly in the case of large-scale gas engines with power levels of for example greater than 3 MW, mixture formation is only effected immediately upstream of the inlet valves. In those so-called air-charged engines, fuel can be individually metered by a respective fuel metering device for each cylinder. Mixture-charged engines in which mixture formation is effected centrally in a gas mixer upstream of the compressor unit, due to the long distances to be covered from mixture formation to the combustion chambers, react only sluggishly to intervention in fuel or gas metering. However, the reaction times are substantially shorter in air-charged engines with fuel metering devices (for example, in the form of port injection valves). Thus, an alteration in the amount of fuel introduced by the fuel metering devices can already act within 10 ms on the mechanical power delivered by the internal combustion engine.

The proposed method is advantageous, in particular, for generators which have an inertia constant of less than or equal to 1.5 Ws/VA, preferably less than or equal to 1 Ws/VA as the back-swing effect acts more strongly on generators with low inertia constants.

In a preferred embodiment, the generator is coupled to the internal combustion engine by a coupling device. The internal combustion engine can be for example a reciprocating piston gas engine operated in accordance with the Otto cycle.

Deviations in operating parameters of the generator during a network fault frequently occur because an imbalance occurs between the mechanical power which is introduced into the generator by the internal combustion engine and the electric power which is fed into the power supply network by the generator. In the case of a back-swing effect occurring as a consequence of the network fault, that imbalance can be caused by the electric power being greater than the mechanical power. It is possible to counteract that imbalance by an increase in the mechanical power delivered by the internal combustion engine.

In accordance with a preferred embodiment of the invention, an electric power delivered to the power supply network by the generator prior to the network fault is detected as an operating parameter. The amount of fuel introduced into the internal combustion engine is increased depending on the electric power delivered to the power supply network by the generator prior to the network fault. In that respect, the amount of fuel fed into the internal combustion engine can be increased substantially proportionally to a difference in the delivered electric power prior to the network fault in relation to a predeterminable reference value—preferably the rated power.

In a preferred embodiment, a rotary speed of the generator and/or the coupling device and/or the internal combustion engine is detected as the operating parameter prior to the network fault. The amount of fuel introduced the internal combustion engine is increased depending on the rotary speed prior to the network fault.

Preferably, a transient rotary speed of the generator and/or the coupling device and/or the internal combustion engine is detected as the operating parameter during the network fault. The amount of fuel introduced into the internal combustion engine is increased substantially proportionally to a difference in the transient rotary speed relative to the rotary speed prior to the network fault.

By way of example, it is possible to implement an increase in the amount of fuel introduced into the internal combustion engine by ascertaining a percentage open position or open time of a fuel metering device in relation to a predeterminable nominal open position or nominal open time of 100% in accordance with following formula F1:

$$S7s = 100\% + (S1_{ref} - S1) * P_{speed},$$

wherein S7s denotes a percentage open position or open time of a fuel metering device in relation to a nominal open position or open time of 100%, $S1_{ref}$ denotes a percentage rotary speed of the generator or the coupling device or the internal combustion engine prior to the network fault in relation to a nominal rotary speed of 100%, S1 denotes the percentage transient rotary speed of the generator or the coupling device or the internal combustion engine during the network fault in relation to a nominal rotary speed of 100% and $P_{speed}$ denotes a positive proportionality factor by which the intensity of the alteration in the open position or open time of a fuel metering device can be influenced.

In accordance with a further embodiment, a change in rotary speed of the generator and/or the coupling device and/or the internal combustion engine is detected as the operating parameter during the network fault. The amount of fuel introduced into the internal combustion engine is increased depending on the magnitude of the change in rotary speed.

A torque at an engine shaft of the internal combustion engine and/or at a rotor shaft of the generator is detected as the operating parameter during the network fault. The amount of fuel introduced into the internal combustion engine is increased depending on the torque.

In a further preferred embodiment, a load angle of the generator is detected as the operating parameter during the network fault, and the amount of fuel introduced into the internal combustion engine is increased substantially indirectly proportionally to the magnitude of the detected load angle.

For example, an increase in the amount of fuel introduced into the internal combustion engine can be implemented by ascertaining a percentage open position or open time of a fuel metering device in relation to a predeterminable nominal open position or nominal open time of 100% in accordance with following formula F2 in the event of a negative load angle:

$$S7s = 100\% - (S2/180) * 100\% * P_{load\_angle},$$

wherein S7s denotes a percentage open position or open time of a fuel metering device in relation to a nominal open position or nominal open time of 100%, S2 denotes the measured negative load angle in degrees and $P_{load\_angle}$ denotes a positive proportionality factor by which the intensity of the alteration in the open position or open time of a fuel metering device can be influenced.

Preferably, the amount of fuel introduced into the internal combustion engine is increased at a maximum to a predeterminable maximum amount. Thus, for example, it is possible to predetermine a maximum value for the parameter S7s of the above-indicated formulae F1 and F2, respectively, above which the percentage open position or open time of a fuel metering device is not to be increased. That safety measure makes it possible to avoid critical operating states of the internal combustion engine.

According to a particularly preferred embodiment, oscillations in an operating parameter of the generator during the network fault are detected, and the amount of fuel introduced into the internal combustion engine is increased if the oscillations exceed a predeterminable intensity. In that respect, oscillations in a load angle of the generator are detected, and the amount of fuel introduced into the internal combustion engine is increased if the oscillations are of an amplitude of more than 2 degrees, preferably more than 10 degrees.

BRIEF DESCRIPTION OF THE DRAWINGS

Further details and advantages of the present invention will now be described by means of the specific description hereinafter. In the drawings.

DETAILED DESCRIPTION OF THE INVENTION

Figure 1:
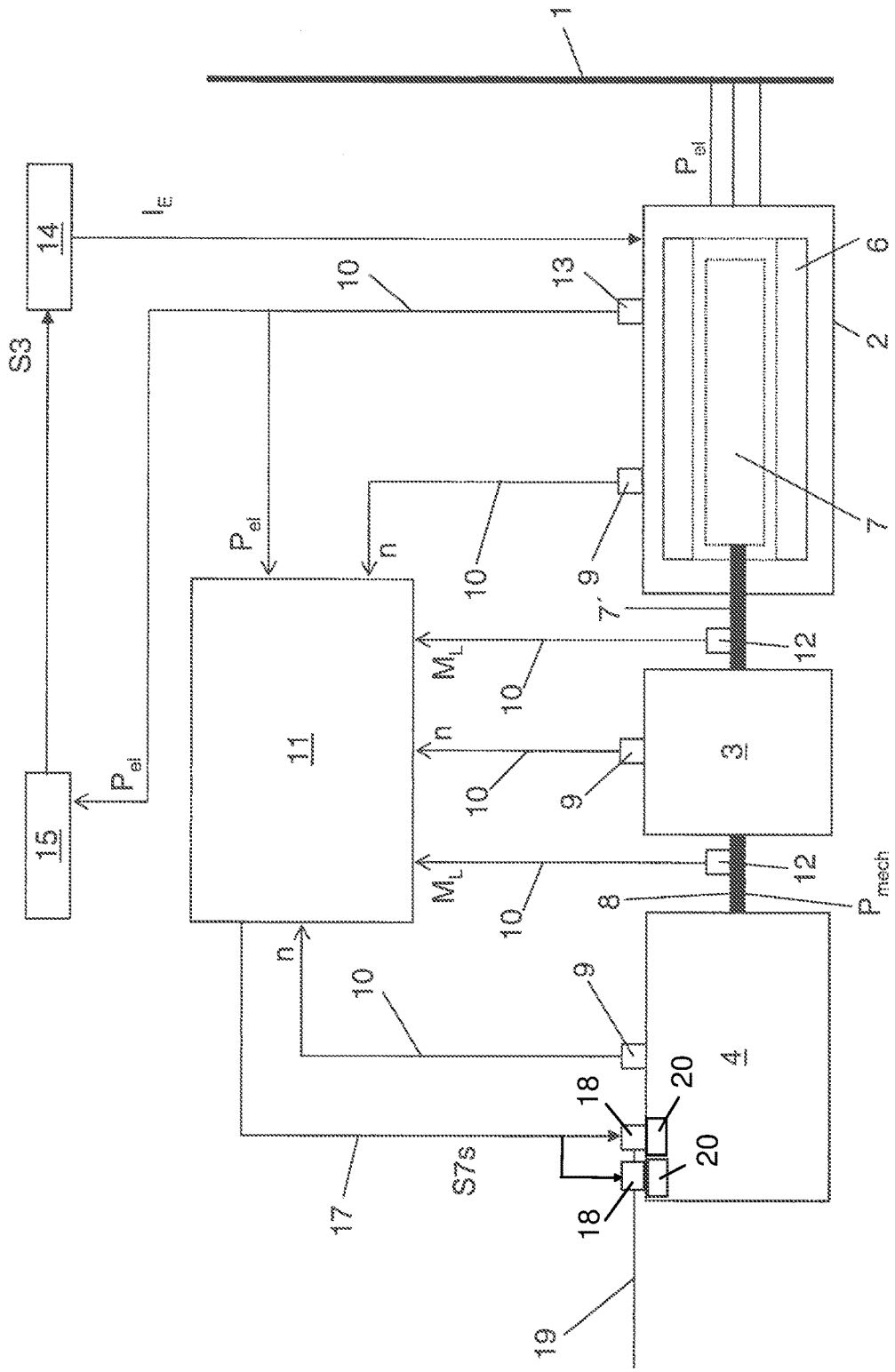
FIG. 1 is a schematic block circuit diagram of a generator which is electrically connected to a power supply network and which is driven by an internal combustion engine.

FIG. 1 in a schematic block circuit diagram shows an electric generator 2 electrically connected to a power supply network 1 of three-phase configuration. The generator 2 is in the form of a synchronous generator and has a stator 6 and a rotor 7 arranged rotatably within the stator 6. The three phases of the power supply network 1 are connected in a known manner to windings on the stator 6 of the generator 2. The power supply network 1 can be a public power supply network which predetermines the network frequency or, for example, a local power supply network in an island mode of operation in which the network frequency is predetermined by the generator 2. The rotor 7 or rotor member of the generator 2 is substantially non-rotatably connected to an engine shaft 8 of an internal combustion engine 4 by a coupling device 3. The internal combustion engine 4 can be, for example, a stationary gas engine which can be in the form of a spark-ignition reciprocating piston engine operated on the Otto cycle.

A mechanical power $P_{mech}$ delivered by the internal combustion engine 4 is introduced into the generator 2 by the engine shaft 8, converted in the generator 2 into electric power $P_{el}$ and, subsequently, the electric power $P_{el}$ is delivered to the power supply network 1.

In the illustrated example, rotary speed sensors 9 which are known in the state of the art are arranged at the generator 2, at the coupling device 3, and at the internal combustion engine 4, by which the rotary speed n of the engine shaft 8 or of the rotor 7 can be detected and signaled by suitable signal lines 10 to a control device 11. In addition, also arranged here at the engine shaft 8 and at the rotor shaft 7' of the rotor 7 are torque sensors 12 with which the mechanical torque $M_L$ at the engine shaft 8 upstream of the coupling device 3 and at the rotor shaft 7' downstream of the coupling device 3 can be detected and signaled by suitable signal lines 10 to the control device 11. The control device 11 can subsequently ascertain the prevailing load angle 5 of the rotor 7 in known manner for example from the detected rotary speed n (see FIG. 2). The load angle 5 can also be ascertained by calculation on the basis of generator reactances and measured electrical parameters (for example voltage, current, power factor).

In addition, arranged on the generator 2 is a power measuring device 13 which is also known in the state of the art and which ascertains the electric power $P_{el}$ fed into the power supply network 1 by the generator 2 and signals the same by a further signal line 10 to the control device 11 and to a voltage regulator 15. In that respect, the power measuring device 13 can ascertain the electric power $P_{el}$ in known manner from voltage and current measurements.

Here the rotor 7 of the generator has exciter windings (not shown in greater detail) which are acted upon by an excitation device 14 in the form of a synchronous machine with an electric exciter current $I_E$. The excitation device 14 is acted upon by the voltage regulator 15 with an exciter voltage S3 whereby an exciter current $I_E$ corresponding to the exciter voltage S3 is set for the exciter windings on the rotor 7 of the generator 2.

By way of an engine control line 17, it is possible to actuate control members of the internal combustion engine 4 to alter the mechanical power delivered by the internal combustion engine 4. The control members can be, for example, fuel metering devices 18 which introduce into the internal combustion engine 4 a fuel provided by way of a fuel line 19.

In particular, the internal combustion engine 4 can be an air-charged gas engine in which a fuel metering device 18 is respectively provided for each cylinder 20 of the gas engine in order to introduce an amount of fuel respectively established by the control device 11 into the respective induction tract of a cylinder, individually for each cylinder. The respective amount of fuel can in that case be set by way of the open position and/or the open time of the corresponding fuel metering device 18.

During a network fault in the power supply network 1, in particular during a network fault which results in a backswing effect, the control device 11, depending on the value of at least one operating parameter of the generator 2 and/or the internal combustion engine 4 prior to the network fault and/or during the network fault, ascertains correspondingly altered open positions and/or open times S7s of the fuel metering devices 18 of the internal combustion engine 4 to increase the amount of fuel to be introduced into the internal combustion engine. The altered open positions and/or open times S7s of the fuel metering devices 18 are signaled to the fuel metering devices 18 of the internal combustion engine 4 by the control device 11 by the engine control line 17.

The altered open positions and/or open times S7s can be percentage open positions or open times of the fuel metering devices 18 in relation to a nominal open position or nominal open time of 100%. In that respect, the altered open positions and/or open times S7s of the fuel metering devices 18 can be ascertained in accordance with foregoing formulae F1 and F2, respectively.

Figure 2:
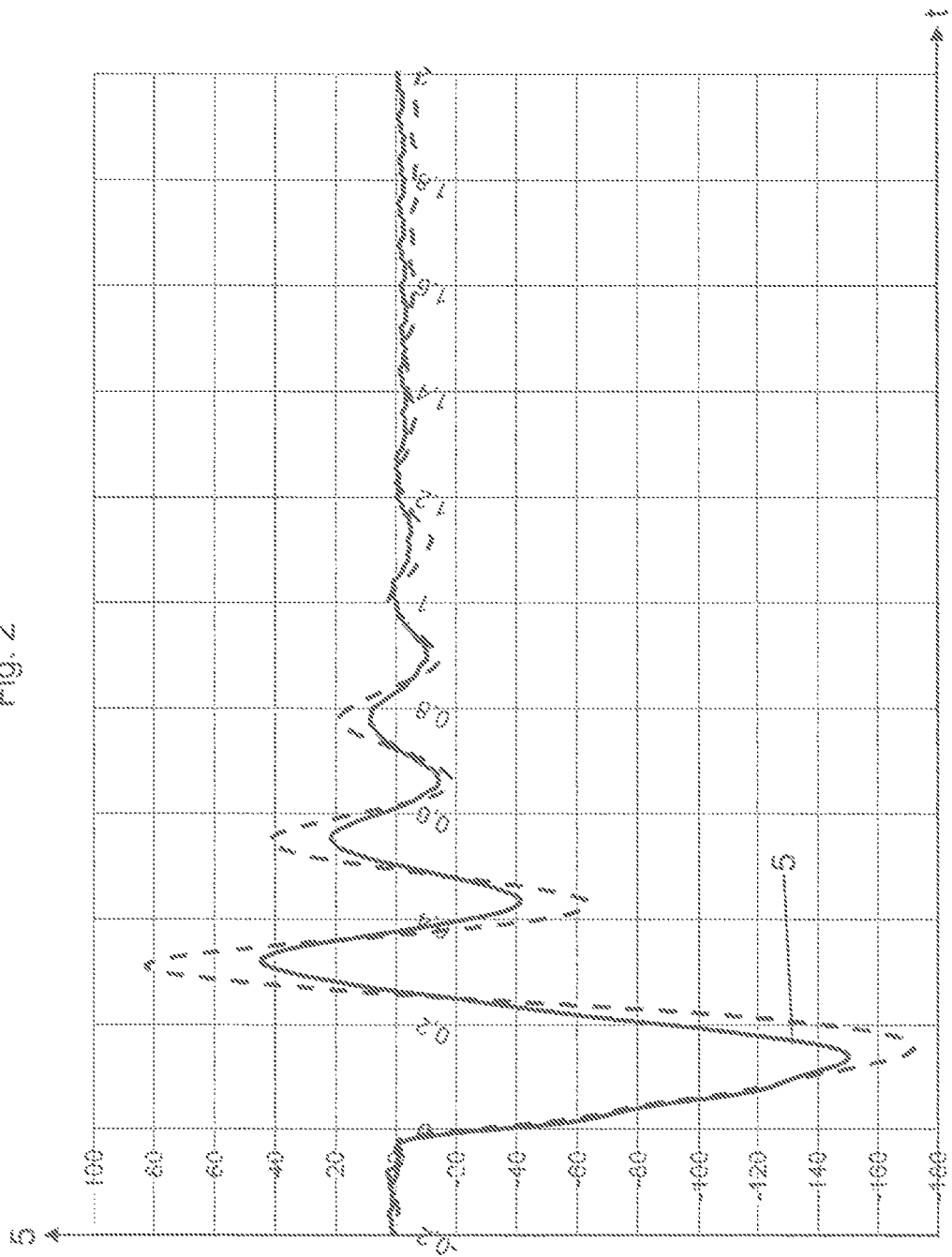
FIG. 2 shows a variation in respect of time by way of example of the load angle of a generator during a network fault in the power supply network.

FIG. 2 shows a variation by way of example of the load angle 5 of the rotor 7 of the generator 2 in degrees in relation to time t in seconds during a network fault which results in a back-swing effect. As can be seen from the illustration, oscillations in the load angle 5 occur during the network fault. The broken-line configuration shows the oscillations in the load angle 5 when applying conventional control measures in relation to the network fault and the solid line shows the configuration of the load angle 5 when applying the proposed method. As can be clearly seen when applying the proposed method, the amplitude of the oscillation in the load angle 5 is reduced, whereby this gives overall a higher degree of stability of the generator 2 during the network fault. It is to be noted in relation to this illustration that a load angle 5 of + or −180 degrees represents the slip limit and therefore, as can be seen, the generator 2 is already brought very close to the slip limit without the proposed method.

Figure 3:
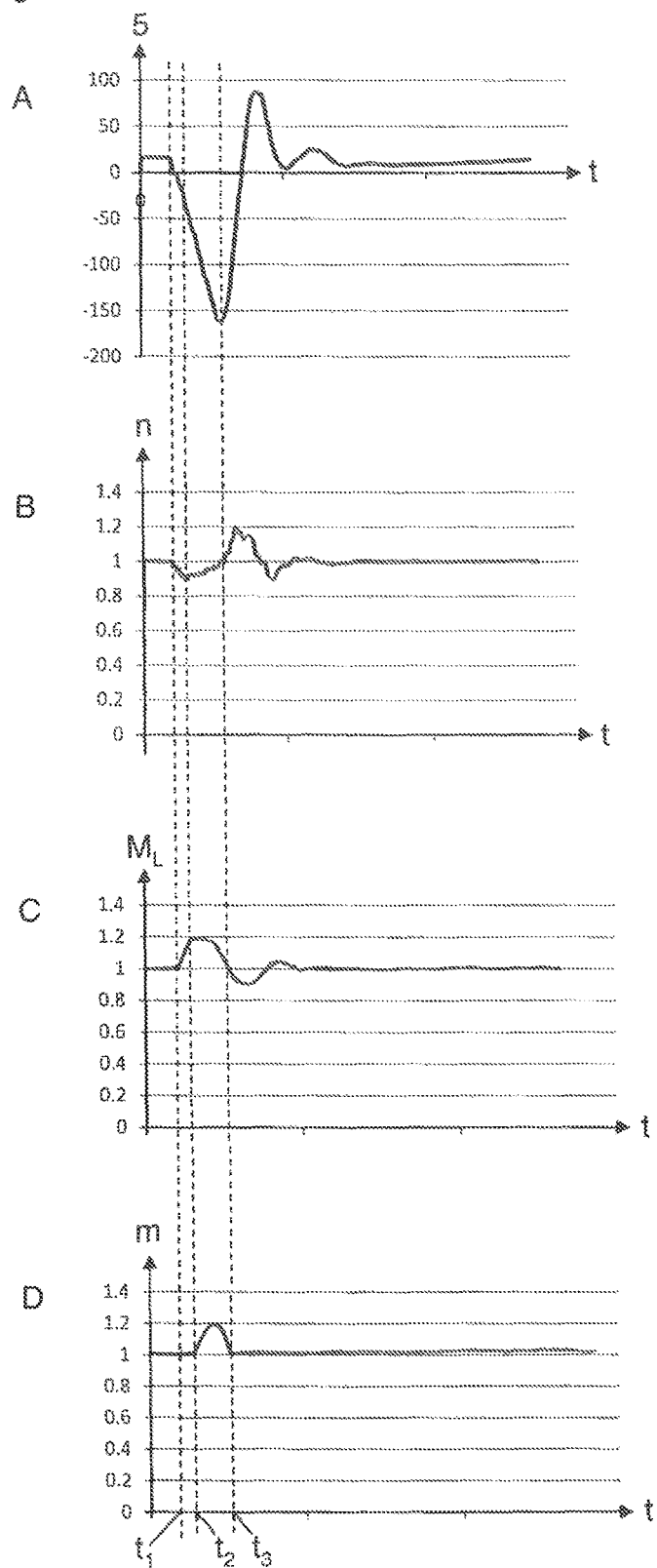
FIG. 3 shows variations in respect of time by way of example of load angle, rotary speed, torque and amount of gas during a network fault in the power supply network.

FIG. 3 shows variations in respect of time by way of example of load angle 5, rotary speed n, torque $M_L$ and amount m of a fuel introduced into an internal combustion engine 4 during a network fault in a power supply network 1.

In that respect, diagram A shows the variation in the load angle 5 of a generator 2 connected to the internal combustion engine 4 (see FIG. 1) in relation to time. Diagram B shows the variation in the rotary speed n of the internal combustion engine 4 in relation to time t. Diagram C shows the variation in the mechanical torque $M_L$ at an engine shaft 8 of the internal combustion engine 4 in relation to time t. Diagram D shows the variation in the amount m of a fuel introduced into the internal combustion engine 4 in relation to time t.

At the time $t_1$ a network fault occurs in the power supply network 1, to which the generator 2 is connected. The network fault shown here results in a back-swing effect, as can be seen at the initially falling rotary speed n of the internal combustion engine 4, that directly follows the network fault. That also results in a correspondingly increasing load angle 5 and an increasing mechanical torque $M_L$ at the engine shaft 8 of the internal combustion engine 4. The amount m of the fuel introduced into the internal combustion engine 4 is increased by virtue of detection of that change in rotary speed at the time $t_2$.

It is possible to counteract that fall in rotary speed or increase in torque by the temporary increase in the amount m of the fuel introduced into the internal combustion engine 4. As a result, at the time $t_3$, the rotary speed n and the torque $M_L$ again regain their values which prevailed before the occurrence of the network fault, whereupon the amount of fuel introduced into the internal combustion engine 4 is also again set to the value which prevailed before the occurrence of the network fault.

Overall, the proposed method makes it possible to increase the stability of electric generators or power plants comprising at least one electric generator driven by an internal combustion engine in situations in which a back-swing effect occurs, triggered by a network fault. During such fault situations with a back-swing effect, conventional control measures are counter-productive as conventional control measures do not take account of the back-swing effect and for example increase the amount of fuel to be introduced into the internal combustion engine instead of throttling it.

Preferably, the proposed method can be used in relation to a network fault only during the occurrence of a back-swing effect, and conventional control measures can be adopted again after the back-swing effect dies away.

The invention claimed is:

1. A method of operating an internal combustion engine connected to an electric generator by a coupling device during a network fault in a power supply network connected to the generator so as to counteract effects of back-swing, said method comprising:
   introducing a mechanical power generated by the internal combustion engine into the generator, and converting the mechanical power into electric power in the generator;
   delivering the electric power to the power supply network;
   temporarily increasing the mechanical power generated by the internal combustion engine depending on a value of at least one operating parameter of at least one of the generator and the internal combustion engine prior to the network fault or during the network fault so as to counteract any drop in rotary speed occurring during the back-swing; and
   detecting a rotary speed of at least one of the generator and the coupling device and the internal combustion engine prior to the network fault as the operating parameter, said temporarily increasing the mechanical power comprising increasing an amount of the fuel introduced into the internal combustion engine depending on the detected rotary speed prior to the network fault.

2. The method as set forth in claim 1, further comprising introducing fuel into the internal combustion engine by at least one fuel metering device.

3. The method as set forth in claim 2, wherein said temporarily increasing the mechanical power comprises increasing an amount of the fuel introduced into the internal combustion engine by adjusting at least one of an open position and an open time of the at least one fuel metering device.

4. The method as set forth in claim 2, wherein the at least one fuel metering device is a port injection valve.

5. The method as set forth in claim 1, wherein the generator has an inertia constant of less than or equal to 1.5 Ws/VA.

6. A method of operating an internal combustion engine connected to an electric generator during a network fault a power supply network connected to the generator so as to counteract effects of back-swing, said method comprising:
   introducing a mechanical power generated by the internal combustion engine into the generator, and converting the mechanical power into electric power in the generator;
   delivering the electric power to the power supply network;
   temporarily increasing the mechanical power generated by the internal combustion engine depending on a value of at least one operating parameter of at least one of the generator and the internal combustion engine prior to the network fault or during the network fault so as to counteract any drop in rotary speed occurring during the back-swing; and
   detecting the electric power delivered to the power supply network by the generator prior to the network fault as an operating parameter, said temporarily increasing the mechanical power comprising increasing an amount of the fuel introduced into the internal combustion engine depending on the detected electric power delivered to the power supply network by the generator prior to the network fault.

7. The method as set forth in claim 6, wherein the amount of the fuel introduced into the internal combustion engine is substantially proportional to a difference in the delivered electric power prior to the network fault in relation to a predeterminable reference value.

8. The method as set forth in claim 7, wherein the predeterminable reference value is a rated power.

9. A method of operating an internal combustion engine connected to an electric generator by a coupling device during a network fault in a power supply network connected to the generator so as to counteract effects of back-swing, said method comprising:
   introducing a mechanical power generated by the internal combustion engine into the generator, and converting the mechanical power into electric power in the generator;
   delivering the electric power to the power supply network;
   temporarily increasing the mechanical power generated by the internal combustion engine depending on a value of at least one operating parameter of at least one of the generator and the internal combustion engine prior to the network fault or during the network fault so as to counteract any drop in rotary speed occurring during the back-swing; and
   detecting a transient rotary speed of at least one of the generator and the coupling device and the internal combustion engine as the operating parameter during the network fault, said temporarily increasing the mechanical power comprising increasing an amount of the fuel introduced into the internal combustion engine substantially proportionally to a difference in the detected transient rotary speed relative to a rotary speed prior to the network fault.

10. A method of operating an internal combustion engine connected to an electric generator by a coupling device during a network fault in a power supply network connected to the generator so as to counteract effects of back-swing, said method comprising:
    introducing a mechanical power generated by the internal combustion engine into the generator, and converting the mechanical power into electric power in the generator;

delivering the electric power to the power supply network;

temporarily increasing the mechanical power generated by the internal combustion engine depending on a value of at least one operating parameter of at least one of the generator and the internal combustion engine prior to the network fault or during the network fault so as to counteract any drop in rotary speed occurring during the back-swing; and detecting a change in rotary speed of at least one of the generator and the coupling device and the internal combustion engine as the operating parameter during the network fault, said temporarily increasing the mechanical power comprising increasing an amount of fuel introduced into the internal combustion engine depending on a magnitude of the detected change in rotary speed.

11. A method of operating an internal combustion engine connected to an electric generator during a network fault in a power supply network connected to the generator so as to counteract effects of back-swing, said method comprising:

introducing a mechanical power generated by the internal combustion engine into the generator, and converting the mechanical power into electric power in the generator;

delivering the electric power to the power supply network;

temporarily increasing the mechanical power generated by the internal combustion engine depending on a value of at least one operating parameter of at least one of the generator and the internal combustion engine prior to the network fault or during the network fault so as to counteract any drop in rotary speed occurring during the back-swing; and detecting a torque at at least one of an engine shaft of the internal combustion engine and a rotor shaft of the generator as the operating parameter during the network fault, said temporarily increasing the mechanical power comprising increasing an amount of the fuel introduced into the internal combustion engine depending on the detected torque.

12. A method of operating an internal combustion engine connected to an electric generator during a network fault in a power supply network connected to the generator so as to counteract effects of back-swing, said method comprising:

introducing a mechanical power generated by the internal combustion engine into the generator, and converting the mechanical power into electric power in the generator;

delivering the electric power to the power supply network;

temporarily increasing the mechanical power generated by the internal combustion engine depending on a value of at least one operating parameter of at least one of the generator and the internal combustion engine prior to the network fault or during the network fault so as to counteract any drop in rotary speed occurring during the back-swing; and detecting a load angle of the generator as the operating parameter during the network fault, said temporarily increasing the mechanical power comprising increasing an amount of the fuel introduced into the internal combustion engine substantially indirectly proportionally to a magnitude of the detected load angle.

13. The method as set forth in claim 1, wherein said temporarily increasing the mechanical power comprises increasing an amount of the fuel introduced into the internal combustion engine at a maximum to a predeterminable maximum amount.

14. A method of operating an internal combustion engine connected to an electric generator during a network fault in a power supply network connected to the generator so as to counteract effects of back-swing, said method comprising:

introducing a mechanical power generated by the internal combustion engine into the generator, and converting the mechanical power into electric power in the generator;

delivering the electric power to the power supply network;

temporarily increasing the mechanical power generated by the internal combustion engine depending on a value of at least one operating parameter of at least one of the generator and the internal combustion engine prior to the network fault or during the network fault so as to counteract any drop in rotary speed occurring during the back-swing; and detecting oscillations in an operating parameter of the generator during the network fault, said temporarily increasing the mechanical power comprising increasing an amount of the fuel introduced into the internal combustion engine if the oscillations exceed a predeterminable intensity.

15. The method as set forth in claim 14, wherein the detected oscillations are oscillations in a load angle of the generator, the amount of the fuel introduced into the internal combustion engine is increased if the oscillations have an amplitude of more than 2 degrees.

16. The method as set forth in claim 14, wherein the amount of the fuel introduced into the internal combustion engine is increased if the oscillations have an amplitude of more than 10 degrees.

17. The method as set forth in claim 1, wherein the electric generator is a synchronous generator, and the network fault is an electric short-circuit.

18. The method as set forth in claim 2, wherein said introducing the fuel into the internal combustion engine comprises introducing the fuel into an induction tract of the internal combustion engine by a respective fuel metering device for each cylinder of the internal combustion engine.

19. The method as set forth in claim 1, wherein the generator has an inertia constant less than or equal to 1 Ws/VA.

* * * * *